US012790959B2

(12) United States Patent
Pruette et al.

(10) Patent No.: US 12,790,959 B2
(45) Date of Patent: Nov. 10, 2026

(54) MANIFOLD MIXING FEATURE

(71) Applicant: RTX Corporation, Farmington, CT (US)

(72) Inventors: Courtney Lana Pruette, Stuart, FL (US); Jeffrey J. Lienau, Wethersfield, CT (US); Kevin M. Brown, Louisville, CO (US); Richard Yu, Wellington, FL (US); Paul K. Sanchez, Wellington, FL (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 19/238,963

(22) Filed: Jun. 16, 2025

(65) Prior Publication Data

US 2025/0305423 A1 Oct. 2, 2025

Related U.S. Application Data

(62) Division of application No. 18/356,650, filed on Jul. 21, 2023, now abandoned.

(51) Int. Cl.

*F01D 25/14* (2006.01)
*F01D 25/24* (2006.01)
*F02C 6/08* (2006.01)
*F02C 7/18* (2006.01)

(Continued)

(52) U.S. Cl.

CPC ............ *F01D 25/14* (2013.01); *F01D 25/24* (2013.01); *F02C 6/08* (2013.01); *F02C 7/18* (2013.01); *F04D 29/54* (2013.01); *F04D 29/542* (2013.01); *F02C 7/185* (2013.01); *F02C 9/18* (2013.01); *F05D 2260/213* (2013.01)

(58) Field of Classification Search

CPC ........................................................ F04D 29/54

See application file for complete search history.

(56) References Cited

U.S. PATENT DOCUMENTS 5,212,940 A 5/1993 Glover
8,100,633 B2 1/2012 Propheter-Hinckley et al.
9,988,943 B2 6/2018 Chasse, Jr. et al.

(Continued)

FOREIGN PATENT DOCUMENTS

EP 2998519 3/2016
EP 3862539 8/2021

OTHER PUBLICATIONS

USPTO; Requirement for Restriction/ Election dated Jun. 14, 2024 in U.S. Appl. No. 18/356,650.

(Continued)

*Primary Examiner* — Gerald L Sung
*Assistant Examiner* — Alyson Joan Harrington
(74) *Attorney, Agent, or Firm* — SNELL & WILMER L.L.P.

(57) ABSTRACT

A gas turbine engine is provided. The gas turbine engine includes a case having a wall that provides a manifold cavity, the wall including an aperture and a bore; a tube assembly with a flange that provides a fluid passage aligned with the aperture; a mixing feature arranged in the manifold cavity and including a plate with a hole; and an insert having a body and a head, the body received in the hole and sealed in the bore, the head capturing the plate against the wall. The mixing feature is configured to divert a flow of cooling fluid in at least a counterclockwise direction improving jet mixing and placement of the cooling fluid.

9 Claims, 9 Drawing Sheets

(51) Int. Cl.

| | |
|---|---|
| ***F04D 29/54*** | (2006.01) |
| *F02C 9/18* | (2006.01) |

(56) References Cited

U.S. PATENT DOCUMENTS

| | | | |
|---|---|---|---|
| 10,422,237 | B2 | 9/2019 | McDavid |
| 11,203,976 | B2 | 12/2021 | Guardi et al. |
| 2013/0283814 | A1 | 10/2013 | Johns |
| 2018/0291754 | A1 | 10/2018 | McDavid |
| 2021/0246832 | A1 | 8/2021 | Tu et al. |
| 2022/0316352 | A1 | 10/2022 | Yazici et al. |

OTHER PUBLICATIONS

USPTO; Non-Final Office Action dated Sep. 5, 2024 in U.S. Appl. No. 18/356,650.
USPTO; Final Office Action dated Mar. 19, 2025 in U.S. Appl. No. 18/356,650.
USPTO; Advisory Action dated May 19, 2025 in U.S. Appl. No. 18/356,650.
European Patent Office, European Search Report dated Dec. 12, 2024 in Application No. 24176425.7.

MANIFOLD MIXING FEATURE

CROSS-REFERENCE TO RELATED APPLICATION

This application is a divisional of, claims priority to and the benefit of, U.S. application Ser. No. 18/356,650, entitled "MANIFOLD MIXING FEATURE," and filed on Jul. 21, 2023, which is hereby incorporated by reference in its entirety for all purposes.

GOVERNMENT LICENSE RIGHTS

This invention was made with Government support under a Government contract awarded by a United States Government Agency. The Government has certain rights in this invention.

FIELD

The present disclosure relates to circulating a cooling fluid within a gas turbine engine, and more particularly, a manifold mixing feature to augment mixing within an annular mixing chamber manifold of a gas turbine engine.

BACKGROUND

Gas turbine engines (such as those used in electrical power generation or used in modern aircraft) typically include a fan section, a compressor section, a combustor section and a turbine section. Fluid, i.e. air, entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low-pressure and high-pressure compressors, and the turbine section includes low-pressure and high-pressure turbines.

SUMMARY

A gas turbine engine is disclosed herein. The gas turbine engine includes a case having a wall that provides a manifold cavity, the wall including an aperture and a bore; a tube assembly with a flange that provides a fluid passage aligned with the aperture; a mixing feature arranged in the manifold cavity and including a plate with a hole; and an insert having a body and a head, the body received in the hole and sealed in the bore, the head capturing the plate against the wall. The mixing feature is configured to divert a flow of a cooling fluid in at least a counterclockwise direction thereby improving jet mixing and placement of the cooling fluid.

In various embodiments, the mixing feature is further configured to divert the flow of the cooling fluid in a clockwise direction thereby generating circumferential swirl. In various embodiments, the gas turbine engine includes a combustor section arranged between a compressor section and a turbine section, the mixing feature arranged upstream of the combustor section and radially outward from a vane in the compressor section. In various embodiments, the vane is supported by an outside wall, the case is an outer case, and the manifold cavity is arranged radially between the outer case and the outside wall, the mixing feature configured to move the cooling fluid circumferentially about the manifold cavity. In various embodiments, the gas turbine engine includes a heat exchanger fluidly connected to the tube assembly, wherein the heat exchanger is arranged fluidly between a compressor stage in the compressor section and the manifold cavity.

In various embodiments, the mixing feature includes a first circular void of a first diameter and a second circular void of a second diameter, the second diameter being smaller than the first diameter. In various embodiments, the first circular void is configured to divert the flow of the cooling fluid in the clockwise direction. In various embodiments, the second circular void is configured to divert the flow of the cooling fluid in the counterclockwise direction. In various embodiments, the second circular void is located opposite the first circular void. In various embodiments, the mixing feature is configured with a third circular void configured to divert the flow of the cooling fluid radially inward, perpendicular to the clockwise direction and the counterclockwise direction.

In various embodiments, the mixing feature includes a plurality of first circular voids of a first diameter and a plurality of second circular voids of a second diameter, the second diameter being larger than the first diameter. In various embodiments, the plurality of first circular voids are configured to divert the flow of the cooling fluid in the clockwise direction. In various embodiments, the plurality of second circular voids are configured to divert the flow of the cooling fluid in the counterclockwise direction. In various embodiments, the plurality of second circular voids are located opposite the plurality of first circular voids. In various embodiments, the mixing feature is configured with a third circular void configured to divert the flow of the cooling fluid radially inward, perpendicular to the clockwise direction and the counterclockwise direction.

In various embodiments, the mixing feature includes a 90-degree elbow tube joined to the plate and fluidly coupled to the hole and configured to divert the flow of the cooling fluid in at least one of the counterclockwise direction or the clockwise direction. In various embodiments, the 90-degree elbow tube is further configured with a plurality of angled sections configured to configured to manipulate the flow of the cooling fluid exiting the 90-degree elbow tube thereby encouraging flow separation. In various embodiments, the 90-degree elbow tube is further configured with a thruster mechanism with a tapered inner circumference that gradually opens axially outward from a first inner diameter to a second outer diameter and wherein the thruster mechanism is held in place in a center of an inner circumference of a distal end of the 90-degree elbow tube via a plurality of standoffs.

In various embodiments, the mixing feature includes a first rectangular void and a second rectangular void. In various embodiments, the first rectangular void is configured to divert the flow of the cooling fluid in the clockwise direction. In various embodiments, the second rectangular void is configured to divert the flow of the cooling fluid in the counterclockwise direction. In various embodiments, the second rectangular void is located opposite the first rectangular void. In various embodiments, the mixing feature further includes a wedge-shaped fluid diversion member disposed within an inner circumference of the mixing feature and configured to direct the flow of the cooling fluid through the first rectangular void and the second rectangular void.

In various embodiments, the mixing feature includes a rectangular void. In various embodiments, the rectangular void is configured to divert the flow of the cooling fluid in at least one of the counterclockwise direction or the clockwise direction. In various embodiments, the wall includes an unmachined inner surface and wherein a gasket is provided between the unmachined inner surface and the plate. In various embodiments, the plate includes first and second faces spaced apart from one another, and the wall includes an inner surface, a first face and the inner surface adjacent to one another, and the head abutting a second face. In various embodiments, the gas turbine engine further includes a fastener securing the flange to the insert and clamping the mixing feature to the case. In various embodiments, the body includes a threaded hole and wherein the fastener is a bolt received in the threaded hole. In various embodiments, the hole is larger than an outer diameter of the body.

Also disclosed herein is a case assembly for a gas turbine engine. The case assembly includes a wall including an aperture and a bore; a mixing feature including a plate with a hole; and an insert having a body and a head, the body received in the hole and sealed in the bore, the head capturing the plate against the wall. The mixing feature is configured to divert a flow of a cooling fluid in at least a counterclockwise direction or a clockwise direction improving jet mixing and placement of the cooling fluid.

The present disclosure may include any one or more of the individual features disclosed above and/or below alone or in any combination thereof.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option. Further, any steps in a method discussed herein may be performed in any suitable order or combination. Additionally, any reference to without contact (or similar phrases) may also include reduced contact or minimal contact. It should also be understood that unless specifically stated otherwise, references to "a," "an," or "the" may include one or more than one and that reference to an item in the singular may also include the item in the plural. Further, all ranges may include upper and lower values and all ranges and ratio limits disclosed herein may be combined.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Regions of the compressor, combustor, or turbine may be hot such that cooling fluid is required. The various embodiments involve cooling air entering into a mixing manifold near the combustor region whereby the mixing of the cooling fluid with warmer air from the diffuser section is augmented by a mixing feature before the cooling air cools the High-Pressure Turbine and High-Pressure Compressor rotors. Various embodiments of the mixing feature are presented herein.

Figure 1:
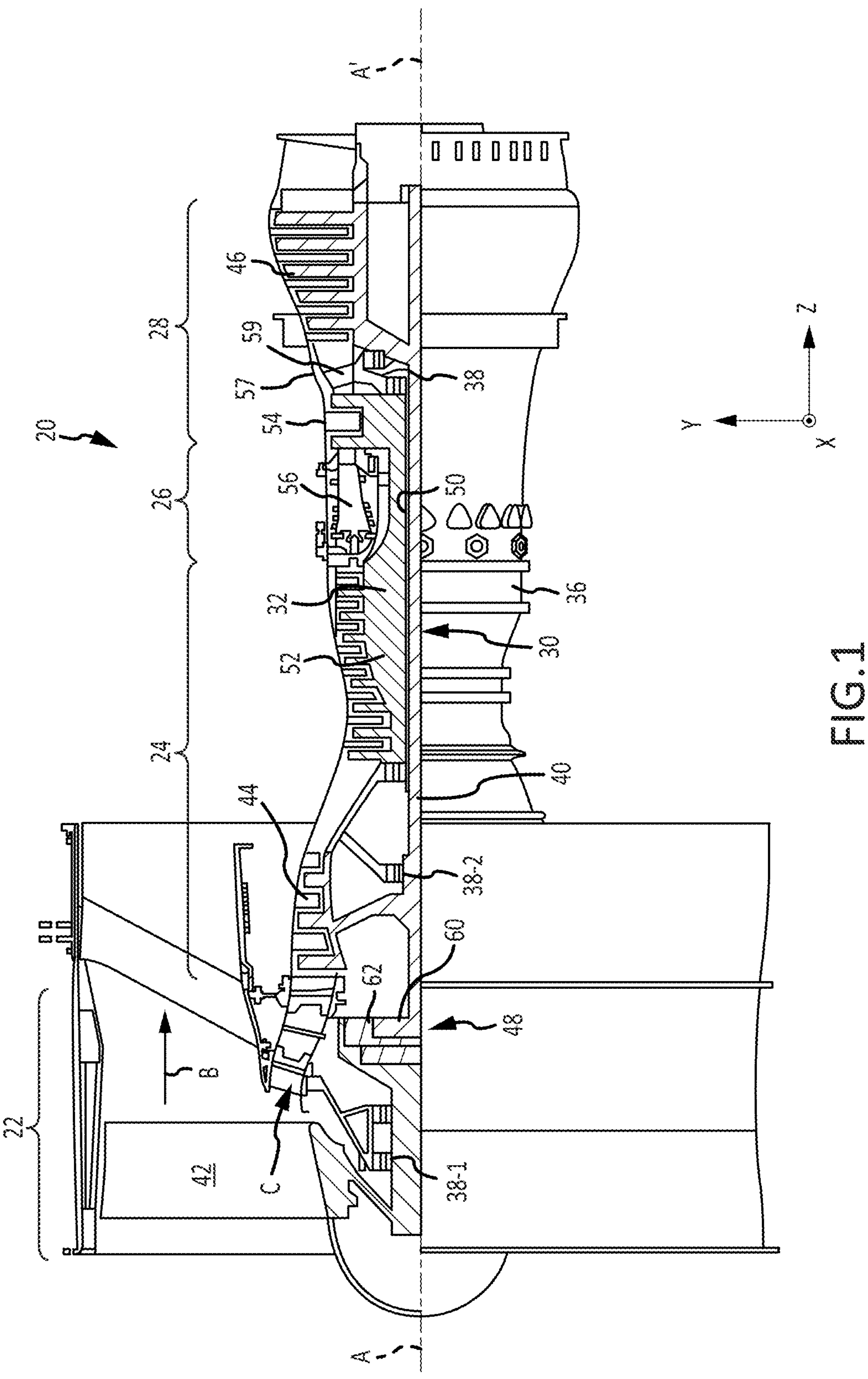
FIG. 1 illustrates a cross-sectional view of a gas-turbine engine, in accordance with various embodiments.

With reference to FIG. 1, a gas turbine engine 20 is illustrated shown according to various embodiments. Gas turbine engine 20 may be a two-spool turbofan that generally incorporates a fan section 22, a compressor section 24, a combustor section 26, and a turbine section 28. In operation, fan section 22 may drive fluid, i.e. air, along a path of bypass airflow B while compressor section 24 may drive the fluid along a core flow path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines.

Gas turbine engine 20 may generally include a low-speed spool 30 and a high-speed spool 32 mounted for rotation about an engine central longitudinal axis A-A' relative to an engine static structure 36 or engine case via several bearing systems 38, 38-1, 38-2, etc. Engine central longitudinal axis A-A' is oriented in the Z direction on the provided X-Y-Z axes. It should be understood that various bearing systems 38 at various locations may alternatively or additionally be provided, including for example, bearing system 38, bearing system 38-1, bearing system 38-2, etc.

Low-speed spool 30 may generally include an inner shaft 40 that interconnects a fan 42, a low-pressure compressor 44, and a low-pressure turbine 46. Inner shaft 40 may be connected to fan 42 through a geared system 48 that may drive the fan 42 at a lower speed than low-speed spool 30. Geared system 48 may include a gear assembly enclosed within a gear housing. Geared system 48 couples the inner shaft 40 to a rotating fan structure. High-speed spool 32 may include an outer shaft 50 that interconnects a high-pressure compressor 52 and high-pressure turbine 54. A combustor 56 may be located between high-pressure compressor 52 and high-pressure turbine 54. A mid-turbine frame 57 of engine static structure 36 may be located generally between high-pressure turbine 54 and low-pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow may be compressed by low-pressure compressor 44 then high-pressure compressor 52, mixed and burned with fuel in combustor 56, then expanded over high-pressure turbine 54 and low-pressure turbine 46. The mid-turbine frame 57 includes airfoils 59 which are in the core airflow path C. Turbines 46, 54 rotationally drive the respective low-speed spool 30 and high-speed spool 32 in response to the expansion. It will be appreciated that each of the positions of the fan section 22, compressor section 24, combustor section 26, turbine section 28, and geared system 48 may be varied. In various embodiments, geared system 48 may be located aft of combustor section 26 or even aft of turbine section 28, and fan section 22 may be positioned forward or aft of the location of geared system 48.

The gas turbine engine 20, in various embodiments, is a high-bypass geared aircraft engine. In various embodiments, the gas turbine engine 20 bypass ratio is greater than about six (6), with an example embodiment being greater than about ten (10), the geared system 48 is an epicyclic gear train, such as a planetary gear system or other gear system, with a gear reduction ratio of greater than about 2.3 and the low-pressure turbine 46 has a pressure ratio that is greater than about five. In one disclosed embodiment, the gas turbine engine 20 bypass ratio is greater than about ten (10:1), the fan diameter is significantly larger than that of the low-pressure compressor 44, and the low-pressure turbine 46 has a pressure ratio that is greater than about five 5:1. Low-pressure turbine 46 pressure ratio is pressure measured prior to inlet of low-pressure turbine 46 as related to the pressure at the outlet of the low-pressure turbine 46 prior to an exhaust nozzle. The geared system 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm (pound of mass) of fuel being burned divided by lbf (pound of force) of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 meters/second).

Figure 2:
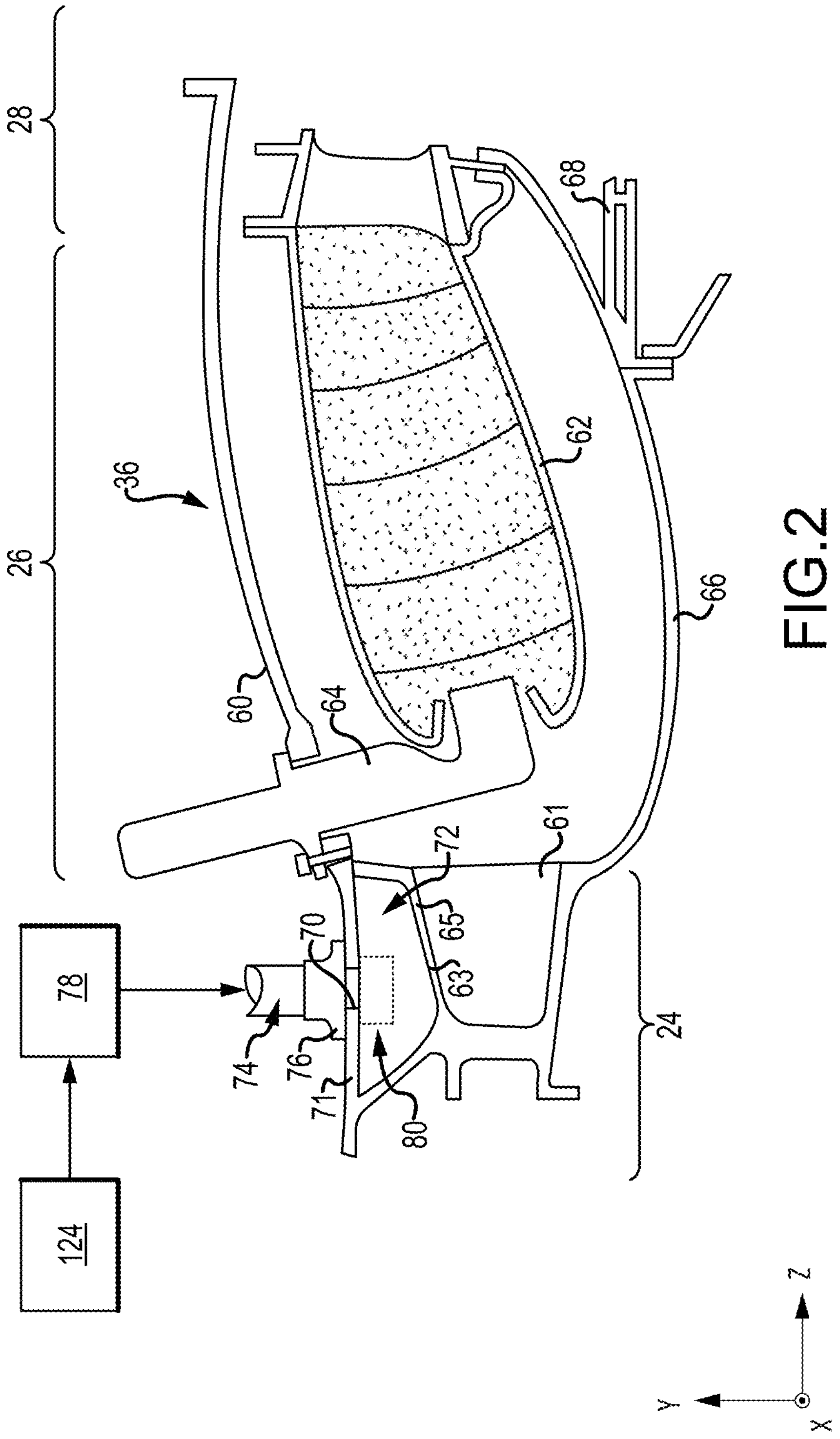
FIG. 2 illustrates an enlarged cross-sectional view through a combustor section and adjacent regions, with a mixing feature secured to an outer case, in accordance with various embodiment.

Referring to FIG. 2, an enlarged cross-sectional view through a combustor section and adjacent regions with a mixing feature secured to an outer case is illustrated, in accordance with various embodiment. In various embodiments, in a compressor section 24 cooling fluid 124 is supplied to a heat exchanger 78, which delivers the cooling fluid 124 through a tube assembly 74 to an outer case 60 of the engine static structure 36 near the combustor section 26. In various embodiments, the tube assembly 74 has a flange 76 secured to a wall 71 of the outer case 60 that provides a fluid passage aligned with an aperture 70 in the outer case 60. In various embodiments, various numbers of tube assemblies may be circumferentially spaced about the outer circumference of the outer case 60 to supply the desired cooling fluid.

The combustor section 26 includes a combustor liner 62 arranged within the outer case 60. A fuel injector 64 delivers fuel to the interior of the combustor liner 62. Fluid, i.e. air, is circulated about the combustor liner 62 and upstream from the turbine section 28 to cool various components. In various embodiments, an inner diffuser case 66 maintains cooling flow about the combustor liner 62. A tangential onboard injector (TOBI) 68 injects the cooling fluid to the turbine section 28.

In various embodiments, cooling fluid is provided near a last stage of the compressor section 24 upstream from the combustor section 26. The compressor section 24 includes a vane 61 supported with respect to the outer case 60 by an outside wall 65. A mixing chamber 72 is provided between the outer case 60 and the outside wall 65. An opening 63 in the outside wall 65 fluidly communicates the cooling fluid from the mixing chamber 72 to the area upstream from the combustor section 26.

The cooling fluid supplied by the heat exchanger 78 may not be evenly distributed around the inner diffuser case 66, creating relatively higher temperature and lower temperature portions on the inner diffuser case 66 in an alternating pattern, which could lead to durability issues. In order to evenly distribute the cooling fluid, i.e., to tend to distribute the cooling flow uniformly across the surface area of the inner diffuser case 66, a plurality of mixing features 80 are arranged in the mixing chamber 72 and secured to the outer case 60 and to at least partially diverts the cooling fluid flow through the aperture 70 into the mixing chamber 72. In that regard, the cooling fluid is provided radially inward through the plurality of mixing features 80 to the mixing chamber 72 where it is mixed with continuously supplied hotter fluid in the mixing chamber 72 at the outside diameter of the diffuser case strut. The mixed cooling fluid and hotter fluid then proceeds through the strut distribution and is then supplied to the high-pressure turbine and low-pressure turbine 46 for cooling. In various embodiments, in order to augment mixing in the mixing chamber 72 to reduce temperature gradients in the chamber and also through the strut distribution, numerous different mixing feature designs may be utilized, hereinafter described in FIGS. 3A, 3B, 4A, 4B, 5A, 5B, 6A, 6B, 7A, 7B, 8A, 8B, 9A, and 9B. In addition, in various embodiments, reducing temperature gradients may enable better detection of failure of the cooling system in the mixing chamber 72 by reducing peak to peak variation at sensors. In various embodiments, the various implementations of the plurality of mixing features 80 provide mixing of the cooling fluid with the hotter fluid by providing circumferential swirl generation, improved jet mixing, and placement of cooling fluid at hotter areas of the flow field.

Figure 3B:
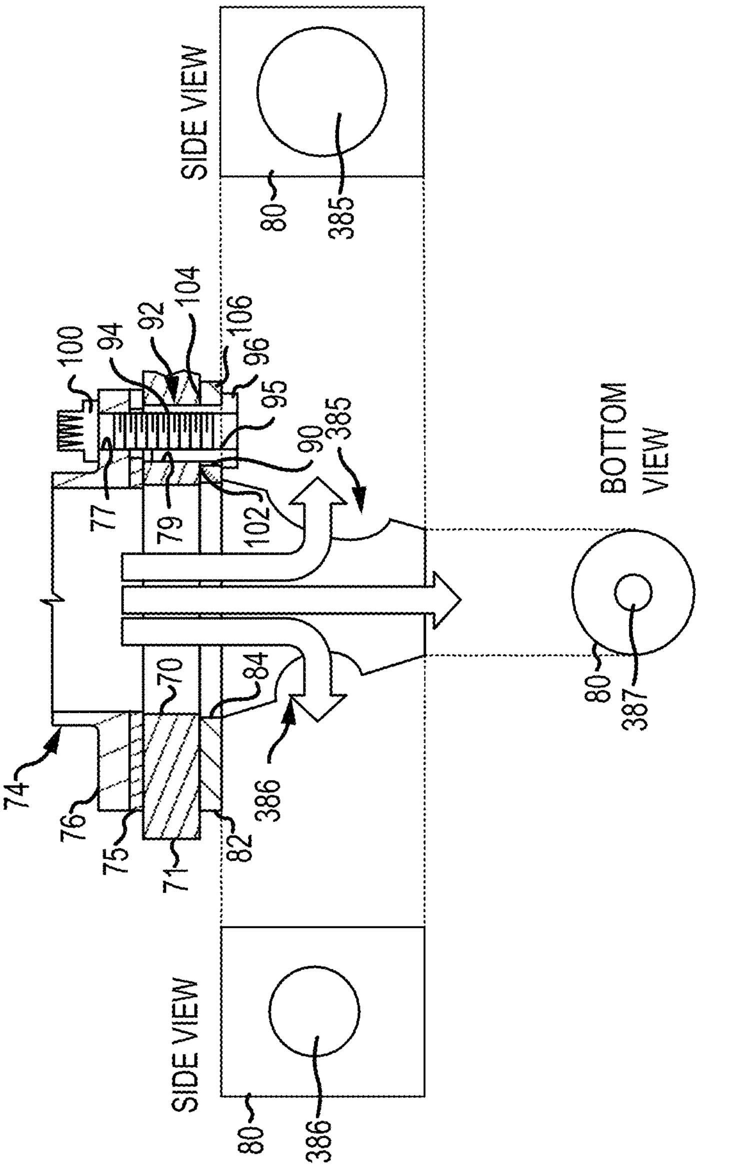
FIGS. 3A and 3B illustrate an enlarged portion of a chamber in the combustor/diffuser area illustrating an insertion of cooling fluid supply, via a first mixing feature design, upstream of a combustor section, in accordance with various embodiments.
Figure 3A:
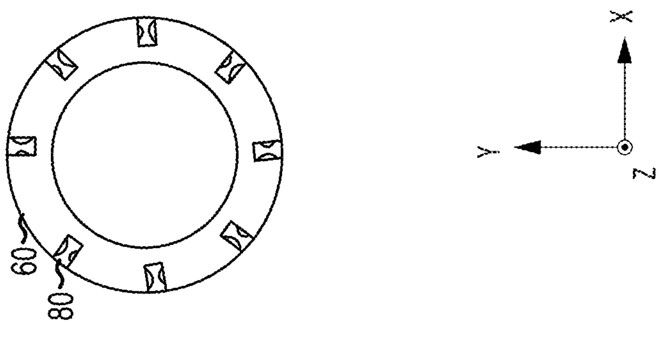

Referring now to FIGS. 3A and 3B, an enlarged portion of a chamber in the combustor/diffuser area illustrating an insertion of cooling fluid supply, via a first mixing feature design, upstream of a combustor section is illustrated, in accordance with various embodiments. In various embodiments, a plurality of mixing features 80 may be circumferentially spaced about the outer circumference of the outer case 60 within a manifold cavity to supply the desired cooling fluid. In various embodiments, the mixing features 80 may be scaled to the outer case 60. In various embodiments, the mixing features 80 may be scaled utilizing a gasket. In various embodiments, the mixing features 80 may be sealed by utilizing press-fit inserts 92 that are used to bolt down the tube assembly 74. In various embodiments, a gasket 75 may be provided between the outer case 60 and the flange 76. In various embodiments, a bore 79 may be provided in the outer case 60 and is aligned with the hole 77 in the flange 76. In various embodiments, the inserts 92 may be added at assembly and do not need to be welded in place or incorporated into the case's casting. In various embodiments, the mixing feature 80 may include a plate 82 that is held in place by the press-fit inserts 92.

In various embodiments, the plate 82 may have an opening 84 that is aligned with the aperture 70 in the wall 71. In various embodiments, the mixing feature 80 may have a cylindrical form tapered radially inward. In various embodiments, the mixing feature 80 may have a cylindrical form with no taper. In various embodiments, the mixing feature 80 includes a first circular void 385 of a first diameter and is configured to divert the flow of fluid in a first circumferential direction, i.e. in a clockwise direction. In various embodiments, by diverting the flow of the fluid in the first direction, a swirl effect is generated within the mixing chamber 72. In various embodiments, the mixing feature 80 includes a second circular void 386, opposite the first circular void 385, the second circular void 386 of a second diameter smaller than the first circular void 385 and is configured to divert the flow of fluid in a second circumferential direction opposite the first direction, i.e. in a counterclockwise direction. In various embodiments, the mixing feature 80 further includes a third circular void 387 configured to direct a flow of the fluid in a third direction perpendicular to the first direction and the second direction, i.e. radially inward. In various embodiments, diverting the flow of the fluid in the second direction and the third direction provides for improved jet mixing and for placing the cooling flow in areas of the mixing chamber 72 where the environment has a low rate of cooling flow. In various embodiments, the first circular void 385, the second circular void 386, and the third circular void 387, may each be formed with a thru-thickness chamfer to diffuse the flow of the fluid.

In various embodiments, the insert 92 includes a body 94 having a first diameter and a head 96 extending radially from an end of the body 94 and that has a second diameter that is larger than the first diameter. In various embodiments, the plate 82 may include a hole 90, which is larger than the first, or outside, diameter to provide assembly clearances. In various embodiments, the insert 92 may be pressed fit into the bore 79 such that the body 94 is in an interference relationship with the outer case 60. In various embodiments, the head 96 may capture the plate 82 against the wall 71. In various embodiments, a fastener 100 may be secured to threaded hole 95 in the insert 92, which clamps the flange 76 and the mixing feature 80 when tightened such that a first face 104 of the plate 82 is adjacent to, and in various embodiments, in engagement with, an inner surface 102 of the wall 71. In various embodiments, the head 96 may abut a second face 106 of the plate 82, which is spaced apart from the first face 104, to capture the plate 82 against the wall 71.

In various embodiments, in assemblies in which the inner surface 102 of the outer case 60 is not machined for the mixing feature 80 (e.g., left in its cast or forged condition; sec FIG. 5), such as engines that might be retrofit with the mixing features, a gasket 110 may be provided between the mixing feature 80 and the outer case 171. In various embodiments, this arrangement may also use the insert 92 to secure the mixing feature 80.

During assembly, in various embodiments, the plate 82 of the mixing feature 80 may be arranged adjacent to the wall 71. In various embodiments, the opening 84 may be aligned with the aperture 70 in the wall 71. In various embodiments, the insert 92 may be pressed into the bore 79. In various embodiments, the plate 82 may be retained relative to the wall 71 with the insert 92 in response to the pressing step, where the body 94 is pushed into the bore 79 in an interference-fit relationship. In various embodiments, the tube assembly 74 may be secured to the wall 71 to fluidly connect the tube assembly 74 to the opening 84 by threading a fastener 100 into the body 94, which clamps the plate 82 to the wall 71 with the head 96. In that regard, in various embodiments, the disclosed mixing features 80 may create a separable assembly from the outer case 60 and may be replaced individually as opposed to replacing the entire case or cooling tube, which leads to a more affordable and producible design.

Figure 4B:
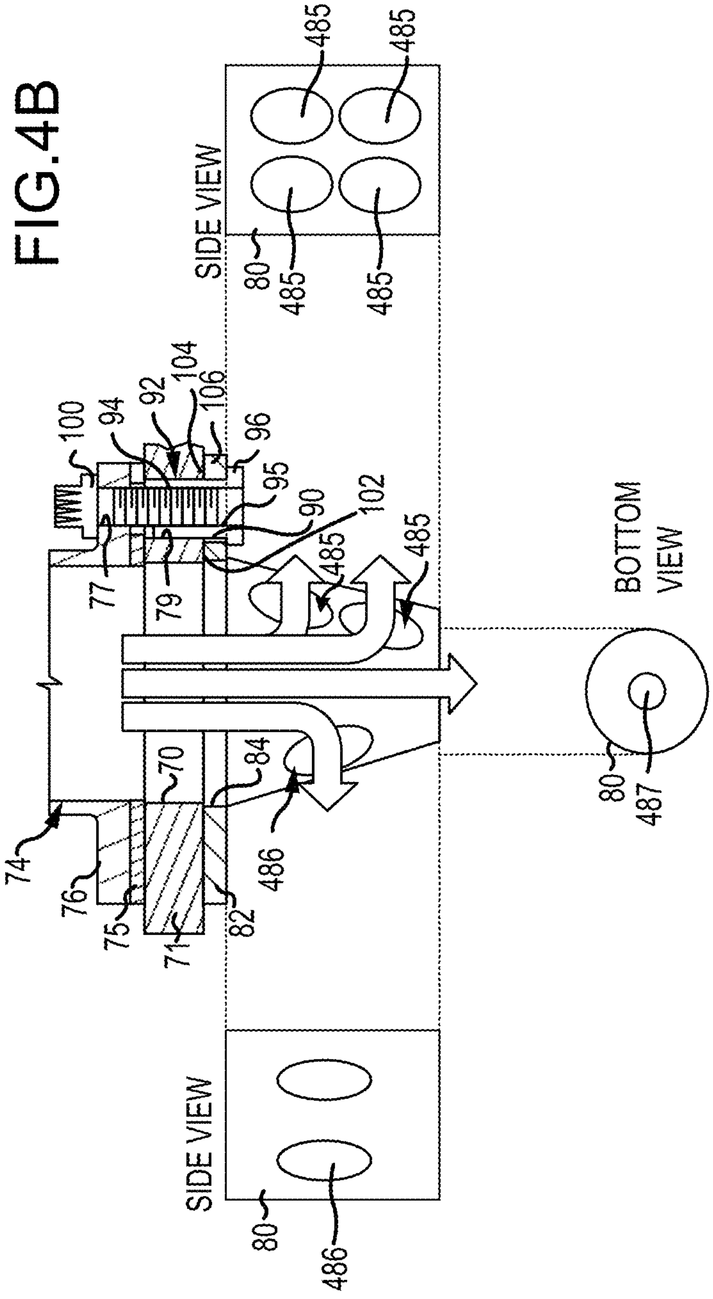
FIGS. 4A and 4B illustrate an enlarged portion of a chamber in the combustor/diffuser area illustrating an insertion of cooling fluid supply, via a second mixing feature design, upstream of a combustor section, in accordance with various embodiments.
Figure 4A:
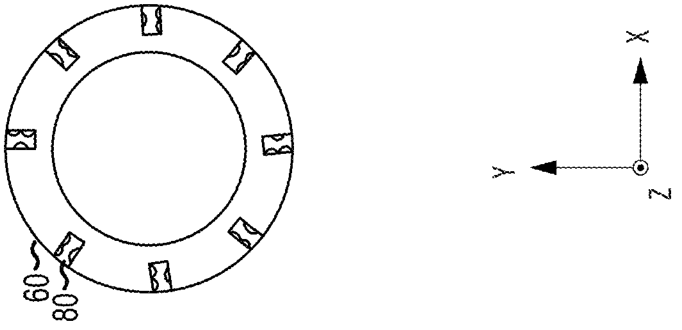

Referring now to FIGS. 4A and 4B, an enlarged portion of a chamber in the combustor/diffuser area illustrating an insertion of cooling fluid supply, via a second mixing feature design, upstream of a combustor section is illustrated, in accordance with various embodiments. FIGS. 4A and 4B are similar to FIGS. 3A and 3B with the exception of a configuration of the mixing features 80. Therefore, elements in FIGS. 4A and 4B not specifically described in FIGS. 4A and 4B operate in a similar manner to the elements described in FIGS. 3A and 3B. Referring to FIGS. 4A and 4B, in various embodiments, a plurality of mixing features 80 may be circumferentially spaced about the outer circumference of the outer case 60 to supply the desired cooling fluid.

In various embodiments, the mixing feature 80 may have a cylindrical form tapered radially inward. In various embodiments, the mixing feature 80 may have a cylindrical form with no taper. In various embodiments, the mixing feature 80 includes a plurality of first circular voids 485 of a first diameter and is configured to divert the flow of fluid in a first circumferential direction, i.e. in a clockwise direction. In various embodiments, by diverting the flow of the fluid in the first direction, a swirl effect is generated within the mixing chamber 72. In various embodiments, the mixing feature 80 includes a plurality of second circular voids 486, opposite the plurality of first circular voids 485, the plurality of second circular voids 486 of a second diameter larger than the plurality of first circular voids 485 and is configured to divert the flow of fluid in a second circumferential direction opposite the first direction, i.e. in a counterclockwise direction. In various embodiments, the mixing feature 80 further includes a third circular void 487 configured to direct a flow of the fluid in a third direction perpendicular to the first direction and the second direction, i.e. radially inward. In various embodiments, diverting the flow of the fluid in the second direction and the third direction provides for improved jet mixing and for placing the cooling flow in areas of the mixing chamber 72 where the environment has a low rate of cooling flow.

In various embodiments, the plurality of first circular voids 485, the plurality of second circular voids 486, and the third circular void 487, may each be formed with a thru-thickness chamfer to diffuse the flow of the fluid. In various embodiments, at least a portion of the plurality of first circular voids 485 and the plurality of second circular voids 486 may be formed radially inward from an outer surface of the mixing feature 80 to an inner surface of the mixing feature 80, while other ones of the plurality of first circular voids 485 and the plurality of second circular voids 486 may be formed normal to the engine centerline from an outer surface of the mixing feature 80 to an inner surface of the mixing feature 80.

Figure 5B:
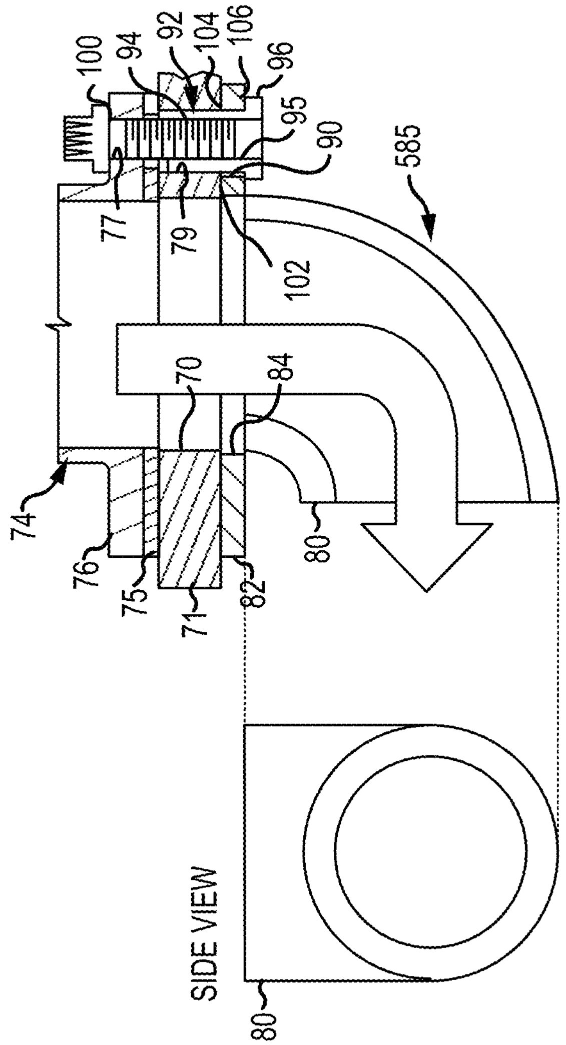
FIGS. 5A and 5B illustrate an enlarged portion of a chamber in the combustor/diffuser area illustrating an insertion of cooling fluid supply, via a third mixing feature design, upstream of a combustor section, in accordance with various embodiments.
Figure 5A:
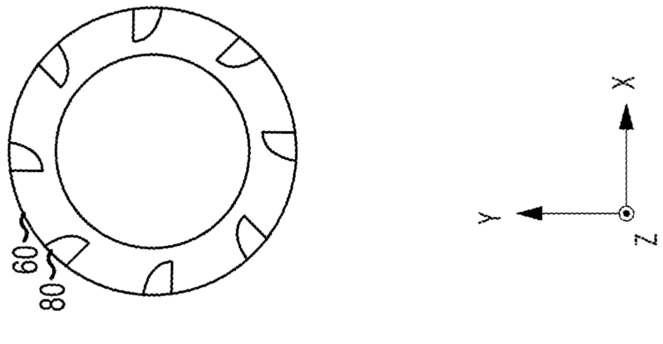

Referring now to FIGS. 5A and 5B, an enlarged portion of a chamber in the combustor/diffuser area illustrating an insertion of cooling fluid supply, via a third mixing feature design, upstream of a combustor section is illustrated, in accordance with various embodiments. FIGS. 5A and 5B are similar to FIGS. 3A and 3B with the exception of a configuration of the mixing features 80. Therefore, elements in FIGS. 5A and 5B not specifically described in FIGS. 5A and 5B operate in a similar manner to the elements described in FIGS. 3A and 3B. Referring now to FIGS. 5A and 5B, in various embodiments, a plurality of mixing features 80 may be circumferentially spaced about the outer circumference of the outer case 60 to supply the desired cooling fluid.

In various embodiments, the mixing feature 80 may have a 90-degree elbow tube 585 that is configured to divert the flow of fluid circumferentially, either in a counterclockwise or clockwise direction. In various embodiments, diverting the flow of the fluid in the circumferential direction creates swirl and places the cooling flow in areas of the mixing chamber 72 where the environment has a low rate of cooling flow.

Figure 6B:
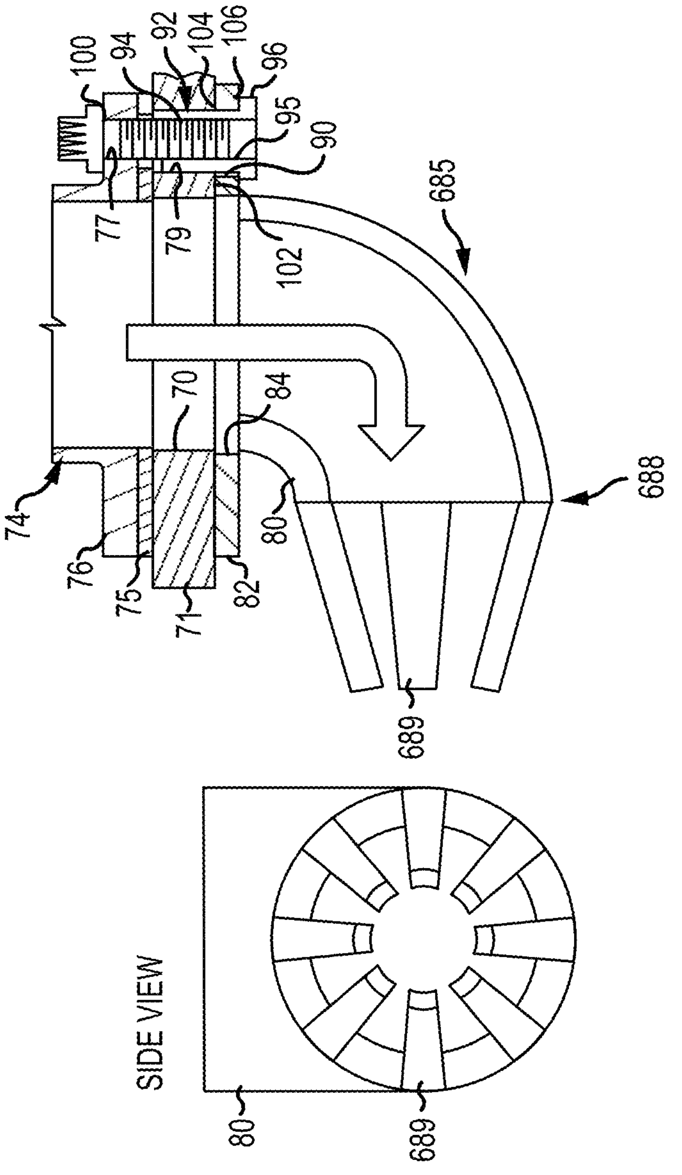
FIGS. 6A and 6B illustrate an enlarged portion of a chamber in the combustor/diffuser area illustrating an insertion of cooling fluid supply, via a fourth mixing feature design, upstream of a combustor section, in accordance with various embodiments.
Figure 6A:
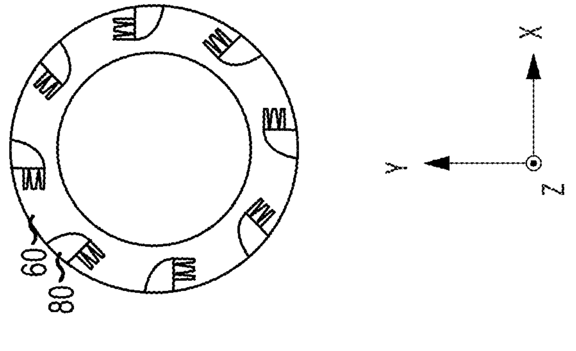

Referring now to FIGS. 6A and 6B, an enlarged portion of a chamber in the combustor/diffuser area illustrating an insertion of cooling fluid supply, via a fourth mixing feature design, upstream of a combustor section is illustrated, in accordance with various embodiments. FIGS. 6A and 6B are similar to FIGS. 3A and 3B with the exception of a configuration of the mixing features 80. Therefore, elements in FIGS. 6A and 6B not specifically described in FIGS. 6A and 6B operate in a similar manner to the elements described in FIGS. 3A and 3B. Referring now to FIGS. 6A and 6B, in various embodiments, a plurality of mixing features 80 may be circumferentially spaced about the outer circumference of the outer case 60 to supply the desired cooling fluid.

In various embodiments, the mixing feature 80 may have a 90-degree elbow tube 685 that is configured to divert the flow of fluid circumferentially, either in a counterclockwise or clockwise direction. In various embodiments, a distal end 688 of the mixing feature 80 may be configured with a plurality of angled sections 689. In various embodiments, the plurality of angled sections 689 include edges configured to manipulate a flow of the exiting fluid, encouraging flow separation, which improves jet mixing. Accordingly, in various embodiments, diverting the flow of the fluid in the circumferential direction creates swirl and places the cooling flow in areas of the mixing chamber 72 where the environment has a low rate of cooling flow.

Figure 7B:
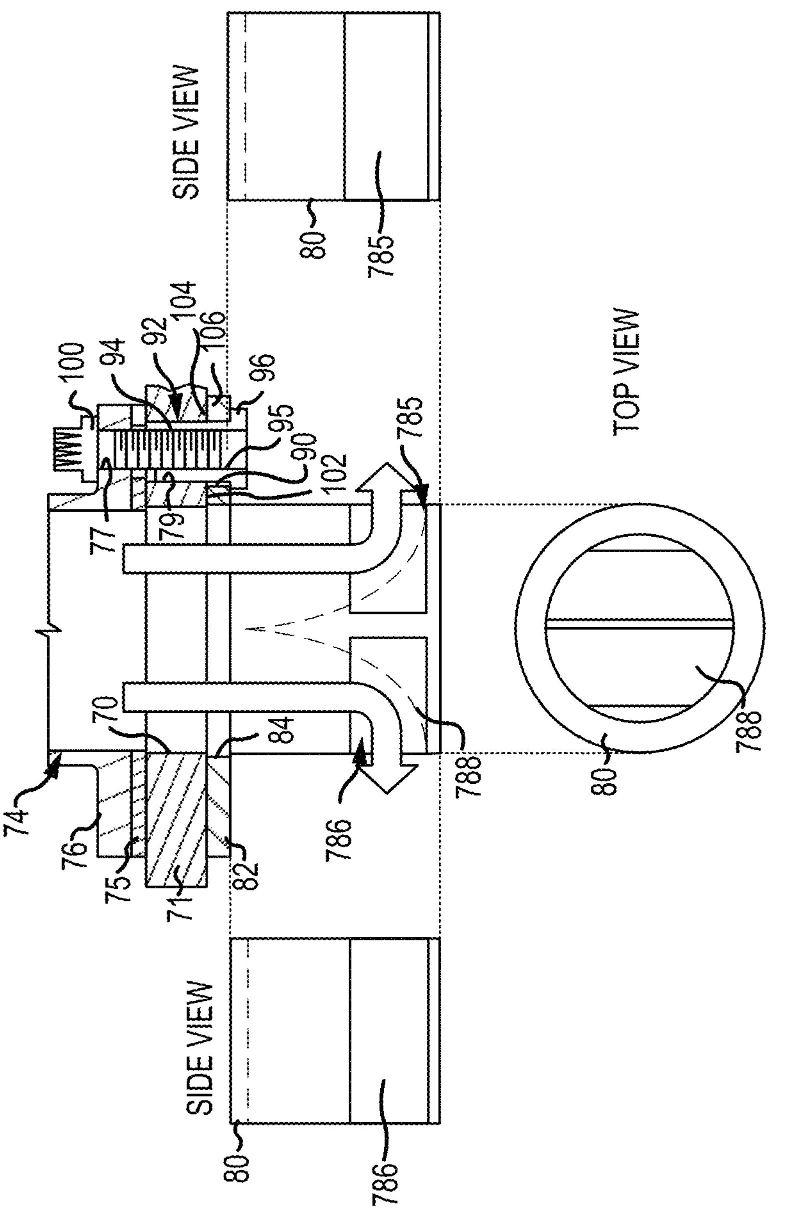
FIGS. 7A and 7B illustrate an enlarged portion of a chamber in the combustor/diffuser area illustrating an insertion of cooling fluid supply, via a fifth mixing feature design, upstream of a combustor section, in accordance with various embodiments.
Figure 7A:
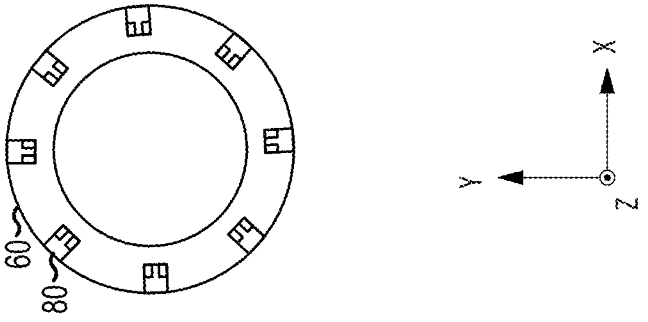

Referring now to FIGS. 7A and 7B, an enlarged portion of a chamber in the combustor/diffuser area illustrating an insertion of cooling fluid supply, via a fifth mixing feature design, upstream from a combustor section is illustrated, in accordance with various embodiments. FIGS. 7A and 7B are similar to FIGS. 3A and 3B with the exception of a configuration of the mixing features 80. Therefore, elements in FIGS. 7A and 7B not specifically described in FIGS. 7A and 7B operate in a similar manner to the elements described in FIGS. 3A and 3B. Referring to FIGS. 7A and 7B, in various embodiments, a plurality of mixing features 80 may be circumferentially spaced about the outer circumference of the outer case 60 to supply the desired cooling fluid.

In various embodiments, the mixing feature 80 may have a cylindrical form. In various embodiments, the mixing feature 80 includes a first rectangular void 785 configured to divert the flow of fluid in a first circumferential direction, i.e. in a clockwise direction. In various embodiments, by diverting the flow of the fluid in the first direction, a swirl effect is generated within the mixing chamber 72. In various embodiments, the mixing feature 80 includes a second rectangular void 786, opposite the first rectangular void 785, the second rectangular void 786 configured to divert the flow of fluid in a second circumferential direction opposite the first direction, i.e. in a counterclockwise direction. In various embodiments, diverting the flow of the fluid in the second direction provides for improved jet mixing and for placing the cooling flow in areas of the mixing chamber 72 where the environment has a low rate of cooling flow. In various embodiments, the mixing feature 80 further includes a wedge-shaped fluid diversion member 788 disposed within the inner circumference of the mixing feature 80 and configured to direct the flow of the fluid through the first rectangular void 785 and the second rectangular void 786.

Figure 8B:
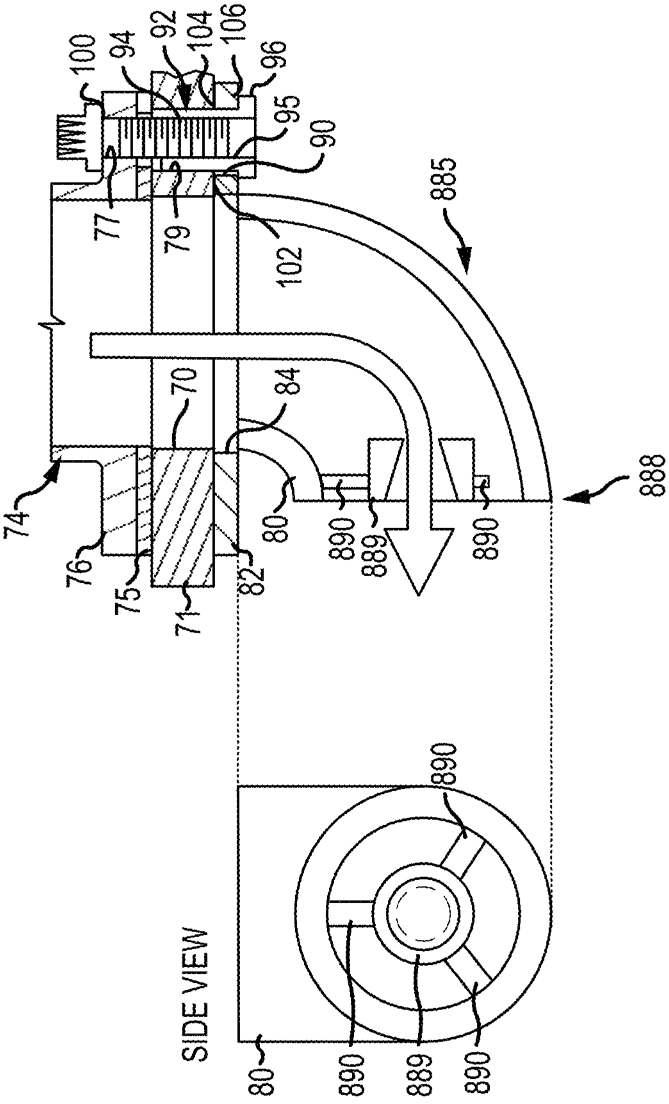
FIGS. 8A and 8B illustrates an enlarged portion of a chamber in the combustor/diffuser area illustrating an insertion of cooling fluid supply, via a sixth mixing feature design, upstream of a combustor section, in accordance with various embodiments.
Figure 8A:
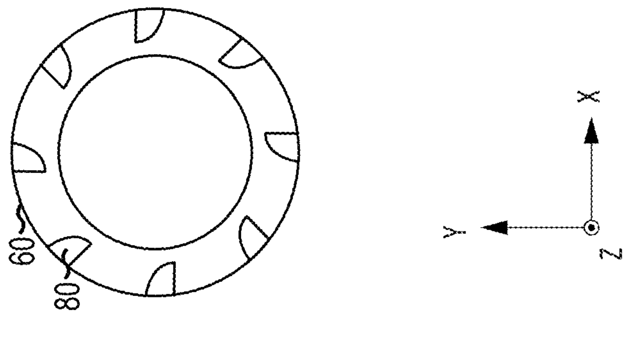

Referring now to FIGS. 8A and 8B, an enlarged portion of a chamber in the combustor/diffuser area illustrating an insertion of cooling fluid supply, via a sixth mixing feature design, upstream from a combustor section is illustrated, in accordance with various embodiments. FIGS. 8A and 8B are similar to FIGS. 3A and 3B with the exception of a configuration of the mixing features 80. Therefore, elements in FIGS. 8A and 8B not specifically described in FIGS. 8A and 8B operate in a similar manner to the elements described in FIGS. 3A and 3B. Referring now to FIGS. 8A and 8B, in various embodiments, a plurality of mixing features 80 may be circumferentially spaced about the outer circumference of the outer case 60 to supply the desired cooling fluid.

In various embodiments, the mixing feature 80 may have a 90-degree elbow tube 885 that is configured to divert the flow of fluid circumferentially, either in a counterclockwise or clockwise direction. In various embodiments, a distal end 888 of the mixing feature 80 may be configured with a thruster mechanism 889. In various embodiments, the thruster mechanism 889 includes a cylindrical outer structure that is positioned in center of the inner circumference of the distal end 888 of the mixing feature 80. In various embodiments, the thruster mechanism 889 may be held in place in the center of the inner circumference of the distal end 888 of the mixing feature 80 via a plurality of standoffs 890. In various embodiments, the thruster mechanism 889 includes a tapered inner circumference that gradually opens axially outward from a first inner diameter to a second outer diameter, where the second outer diameter is larger than the first inner diameter. In various embodiments, diverting the flow of the fluid in the circumferential creates swirl and places the cooling flow in areas of the mixing chamber 72 where the environment has a low rate of cooling flow. The thruster mechanism improves jet mixing by creating a swirling jet with flow diffusion through the inner passage.

Figure 9B:
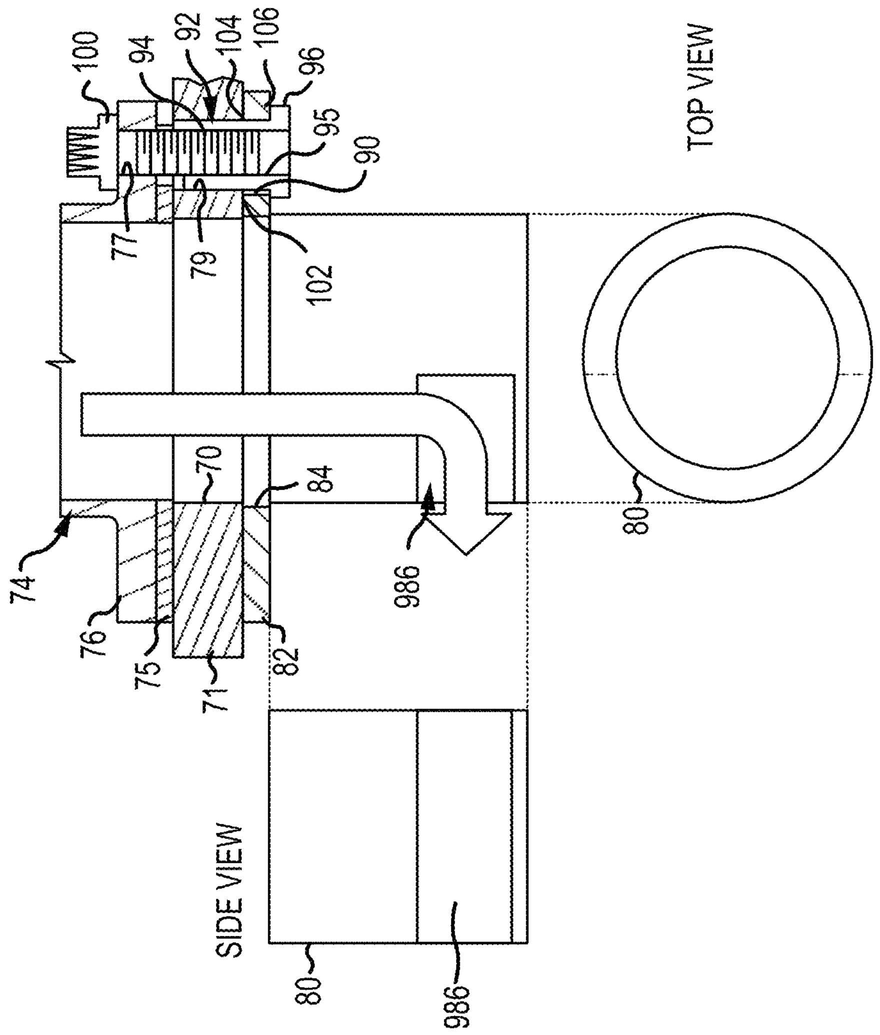
FIGS. 9A and 9B illustrate an enlarged portion of a chamber in the combustor/diffuser area illustrating an insertion of cooling fluid supply, via a seventh mixing feature design, upstream of a combustor section, in accordance with various embodiments.
Figure 9A:
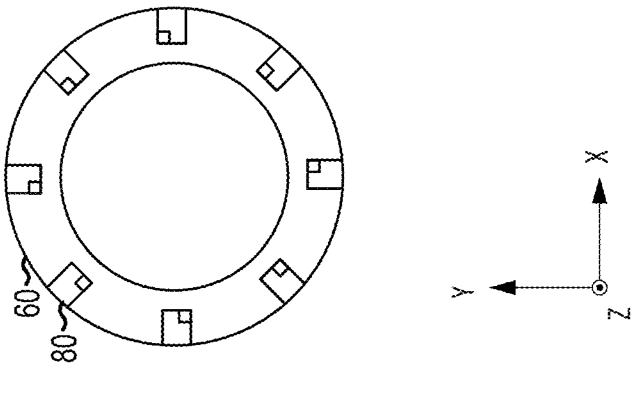

Referring now to FIGS. 9A and 9B, an enlarged portion of a chamber in the combustor/diffuser area illustrating an insertion of cooling fluid supply, via a seventh mixing feature design, upstream from a combustor section is illustrated, in accordance with various embodiments. FIGS. 9A and 9B are similar to FIGS. 3A and 3B with the exception of a configuration of the mixing features 80. Therefore, elements in FIGS. 9A and 9B not specifically described in FIGS. 9A and 9B operate in a similar manner to the elements described in FIGS. 3A and 3B. Referring to FIGS. 9A and 9B, in various embodiments, a plurality of mixing features 80 may be circumferentially spaced about the outer circumference of the outer case 60 to supply the desired cooling fluid.

In various embodiments, the mixing feature 80 may have a cylindrical form. In various embodiments, the mixing feature 80 a rectangular void 986 configured to divert the flow of fluid circumferentially, either in a counterclockwise or clockwise direction. In various embodiments, diverting the flow of the fluid in the circumferential direction creates swirl and places the cooling flow in areas of the mixing chamber 72 where the environment has a low rate of cooling flow. The rectangular void encourages jet mixing by distributing the flow around the circumference of the mixing feature.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gas turbine engine comprising:

a case having a wall that provides a manifold cavity, the wall including an aperture and a bore;

a tube assembly with a flange that provides a fluid passage aligned with the aperture;

a mixing feature arranged in the manifold cavity and including a plate with a hole; and an insert having a body and a head, the body received in the hole and sealed in the bore, the head capturing the plate against the wall, wherein the mixing feature is configured to divert a flow of a cooling fluid in at least a counterclockwise direction thereby improving jet mixing and placement of the cooling fluid, wherein the mixing feature is further configured to divert the flow of the cooling fluid in a clockwise direction thereby generating circumferential swirl, wherein the mixing feature includes a first rectangular void and a second rectangular void, wherein the first rectangular void is configured to divert the flow of the cooling fluid in the clockwise direction, wherein the second rectangular void is configured to divert the flow of the cooling fluid in the counterclockwise direction, wherein the second rectangular void is located opposite the first rectangular void, and wherein the mixing feature further comprises a wedge-shaped fluid diversion member disposed within an inner circumference of the mixing feature and configured to direct the flow of the cooling fluid through the first rectangular void and the second rectangular void.

2. The gas turbine engine of claim 1, further comprising:

a combustor section arranged between a compressor section and a turbine section, the mixing feature arranged upstream of the combustor section and radially outward from a vane in the compressor section.

3. The gas turbine engine of claim 2, wherein the vane is supported by an outside wall, the case is an outer case, and the manifold cavity is arranged radially between the outer case and the outside wall, the mixing feature configured to move the cooling fluid circumferentially about the manifold cavity.

4. The gas turbine engine of claim 3, further comprising:

a heat exchanger fluidly connected to the tube assembly, wherein the heat exchanger is arranged fluidly between a compressor stage in the compressor section and the manifold cavity.

5. The gas turbine engine of claim 1, wherein the wall includes an unmachined inner surface and wherein a gasket is provided between the unmachined inner surface and the plate.

6. The gas turbine engine of claim 1, wherein the plate includes a first face and a second face spaced apart from one another, and the wall includes an inner surface, the first face and the inner surface adjacent to one another, and the head abutting the second face.

7. The gas turbine engine of claim 1, further comprising:

a fastener securing the flange to the insert and clamping the mixing feature to the case, wherein the body includes a threaded hole and wherein the fastener is a bolt received in the threaded hole.

8. The gas turbine engine of claim 1, wherein the hole is larger than an outer diameter of the body.

9. A case assembly for a gas turbine engine, comprising:

a wall including an aperture and a bore;

a mixing feature including a plate with a hole; and an insert having a body and a head, the body received in the hole and sealed in the bore, the head capturing the plate against the wall, wherein the mixing feature is configured to divert a flow of a cooling fluid in at least one of a counterclockwise direction or a clockwise direction improving jet mixing and placement of the cooling fluid, wherein the mixing feature includes a first rectangular void and a second rectangular void, wherein the first rectangular void is configured to divert the flow of the cooling fluid in the clockwise direction, wherein the second rectangular void is configured to divert the flow of the cooling fluid in the counterclockwise direction, wherein the second rectangular void is located opposite the first rectangular void, and wherein the mixing feature further comprises a wedge-shaped fluid diversion member disposed within an inner circumference of the mixing feature and configured to direct the flow of the cooling fluid through the first rectangular void and the second rectangular void.

* * * * *